(12) United States Patent
Kuroda et al.

(10) Patent No.: US 6,967,423 B2
(45) Date of Patent: Nov. 22, 2005

(54) BRUSHLESS ALTERNATOR FIELD COIL BOBBIN APPARATUS

(75) Inventors: Motokazu Kuroda, Tokyo (JP); Kyoko Higashino, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/795,265

(22) Filed: Mar. 9, 2004

(65) Prior Publication Data

US 2005/0046306 A1   Mar. 3, 2005

(30) Foreign Application Priority Data

Sep. 1, 2003   (JP) .............................. 2003-309078

(51) Int. Cl.[7] ....................... H02K 29/00; H02K 21/22; H02K 1/14
(52) U.S. Cl. ....................... 310/194; 310/263
(58) Field of Search ................ 310/194, 263, 310/91

(56) References Cited

U.S. PATENT DOCUMENTS 3,671,906 A * 6/1972 Hodges et al. .............. 336/208
5,097,169 A * 3/1992 Fukushima ................. 310/263
6,384,506 B1 * 5/2002 Kojima et al. .............. 310/194

FOREIGN PATENT DOCUMENTS

JP     11-055922 A    2/1999
JP    2001-292550 A   10/2001

* cited by examiner

Primary Examiner—Tran Nguyen
(74) Attorney, Agent, or Firm—Sughrue Mion, PLLC

(57) ABSTRACT

An annular stepped portion is formed at a first end of an inner circumferential surface of a thick ring-shaped second yoke portion, a second axial end portion of a cylindrical portion of a plate is fitted inside so as to overlap with the stepped portion in a radial direction, and the cylindrical portion of the plate is integrated with the second yoke portion by welding in the radially-overlapping region.

3 Claims, 3 Drawing Sheets

BRUSHLESS ALTERNATOR FIELD COIL BOBBIN APPARATUS

BACKGROUND OF THE INVENTION

1. Field of the Invention

The present invention relates to a bobbin apparatus for holding a field coil of a brushless alternator and particularly to a joining construction between a yoke portion and a plate constituting the bobbin apparatus.

2. Description of the Related Art

Conventional bobbin apparatuses for holding a field coil of a brushless alternator are provided with: a yoke portion composed of a thick cylindrical thick portion and a thin cylindrical thin portion disposed so as to protrude axially from a minimum radius portion of this thick portion; a plate composed of a cylindrical portion and a disk-shaped flange portion disposed so as to extend radially outward from one end of this cylindrical portion; and a bobbin composed of a cylindrical portion and a pair of disk-shaped flange portions disposed so as to extend radially outward from two ends of this cylindrical portion. The cylindrical portion of the bobbin is mounted so as to be fitted over the cylindrical portion of the plate, the cylindrical portion of the plate is mounted so as to be fitted over the thin portion of the yoke portion, and the cylindrical portion of the plate and the thin portion are integrated by welding through welding apertures disposed through the cylindrical portion of the bobbin. (See Patent Literature 1, for example.)

Patent Literature 1: Japanese Patent Laid-Open No. HEI 11-55922 (Gazette, FIG. 21).

Generally, the smaller the winding diameter of the field coil, the more field coil material that can be saved because the length of the conducting wire can be shortened even with an equal number of winds, thereby enabling reductions in cost.

In conventional bobbin apparatuses, because the cylindrical portion of the plate mounted so as to be fitted over the thin portions of the yoke portion is integrated by welding, the inside diameter of the bobbin mounted to the cylindrical portion of the plate is increased by an amount proportionate to the thickness of the thin portion of the yoke portion. As a result, because the winding diameter of the field coil is larger, increasing the length of the conducting wire, one disadvantage has been that the amount of field coil material is increased, preventing reductions in cost. Furthermore, because a yoke portion having a thin portion is prepared from a round bar by turning, other disadvantages have been that the disposal rate of material is large and manufacturing time is lengthy, thereby preventing reductions in cost.

Because the cylindrical portion of the plate and the thin portion of the yoke portions are welded through welding apertures disposed through the cylindrical portion of the bobbin, another disadvantage has been that if there are changes in position or increases in the number of welds accompanying changes in the welding specification, it is necessary to prepare a bobbin in which the position and number of welding apertures are modified, reducing the degree of design freedom and also preventing reductions in cost.

Now, it is also conceivable that the thin portion could be omitted to reduce the inside diameter of the bobbin, and a second axial end surface of the cylindrical portion of the plate could be abutted to a first end surface of the yoke portion and integrated by welding. However, because the plates are then supported by the yoke portions using a cantilever construction, a first end of the plates that is farthest away from the portion fixed to the yoke portion becomes a free end, giving rise to new problems such as the plate vibrating significantly when mounted to an alternator.

SUMMARY OF THE INVENTION

An object of the present invention is to provide a brushless alternator field coil bobbin apparatus ensuring vibration resistance and enabling reductions in cost by reducing the amount of field coil material by adopting a joining construction between a yoke portion and a plate that reduces an inside diameter of a bobbin while ensuring supporting strength for the plate.

With the above object in view, according to the present invention, there is provided a brushless alternator field coil bobbin apparatus including: a thick ring-shaped yoke portion; a plate including a cylindrical portion, and a disk-shaped flange portion disposed so as to extend radially outward from a first end of the cylindrical portion; and a bobbin onto which a field coil is wound. A stepped portion is recessed into an inner circumferential surface of the yoke portion so as to extend axially for a predetermined length from a first end of the yoke portion. A second axial end portion of the cylindrical portion of the plate is fitted into the stepped portion so as to be placed in close contact with an inner circumferential surface thereof and is welded to the yoke portion. The bobbin is mounted into a space formed by the yoke portion and the plate.

According to the present invention, a plate is supported by a yoke portion in a state of surface contact, ensuring supporting strength for the plate. In addition, because the plate is welded directly onto the yoke portion axially outside a bobbin, an inside diameter of the bobbin is reduced, enabling material in the field coil to be reduced, thereby enabling reductions in cost.

DETAILED DESCRIPTION OF THE PREFERRED EMBODIMENTS

Preferred embodiments of the present invention will now be explained with reference to the drawings.

Embodiment 1

Figure 1:
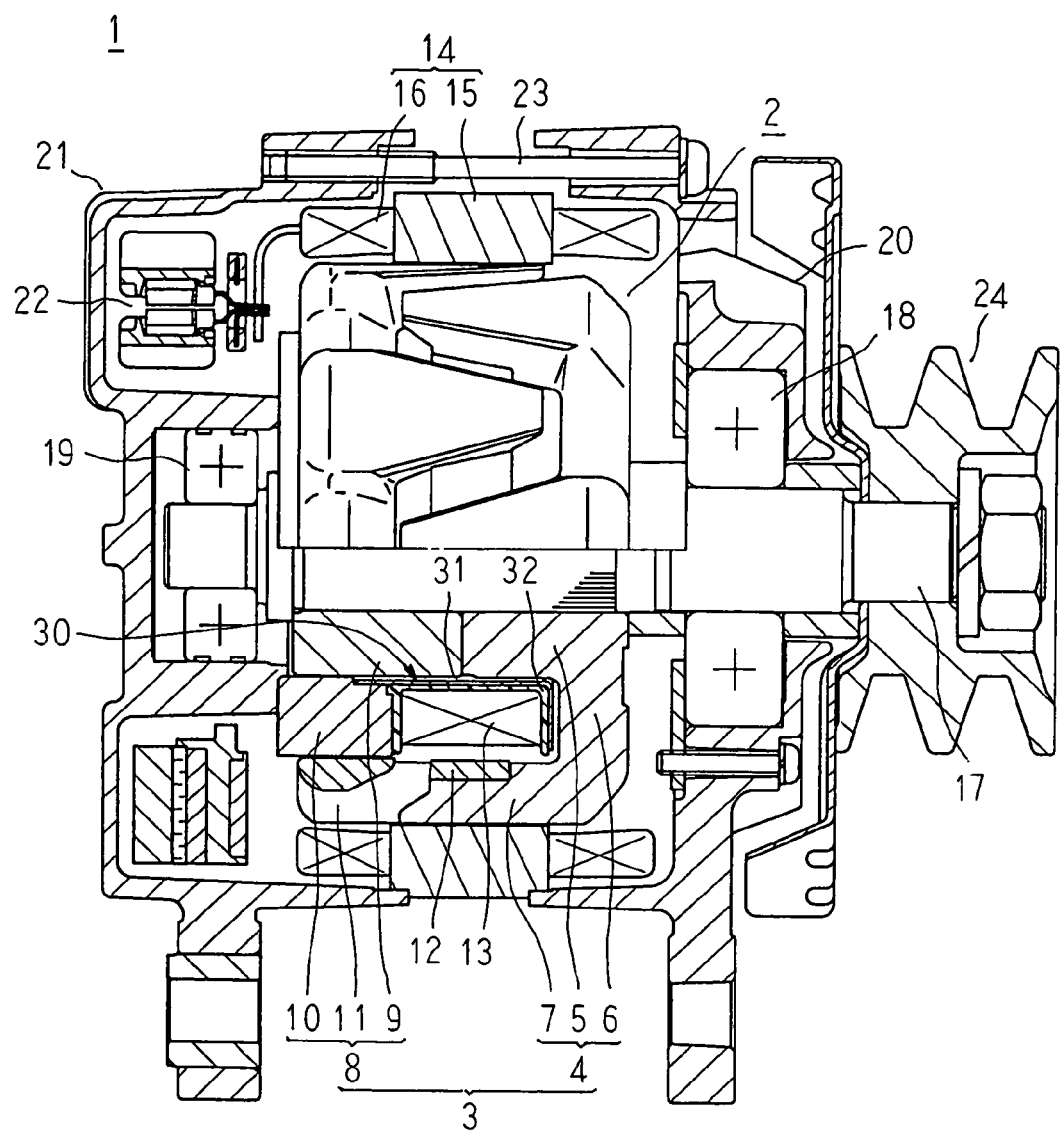
FIG. 1 is a longitudinal section showing a brushless alternator according to Embodiment 1 of the present invention.
Figure 2:
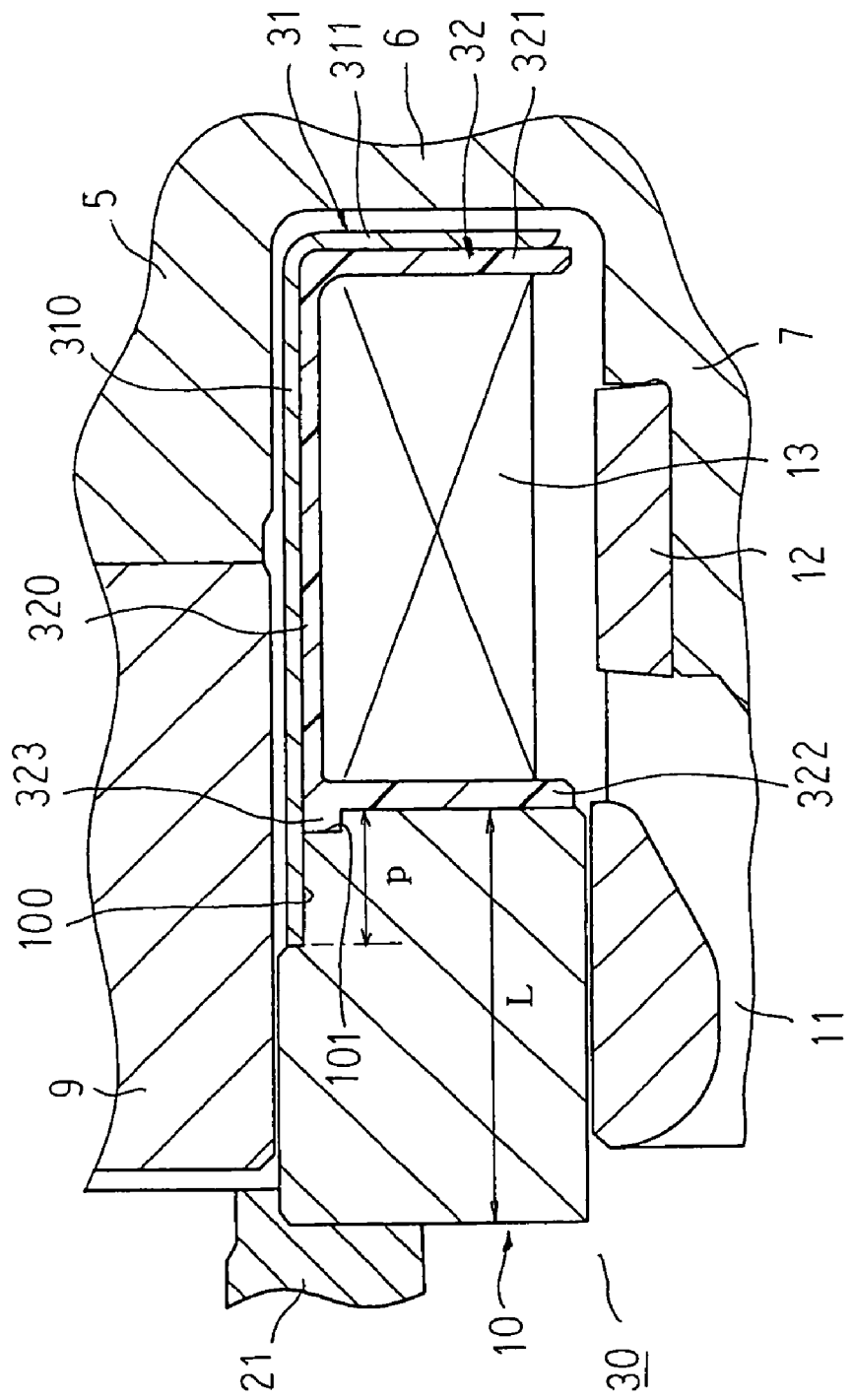
FIG. 2 is a partial enlarged cross section showing a vicinity of a bobbin apparatus of a field coil in the brushless alternator shown in FIG. 1.
Figure 3:
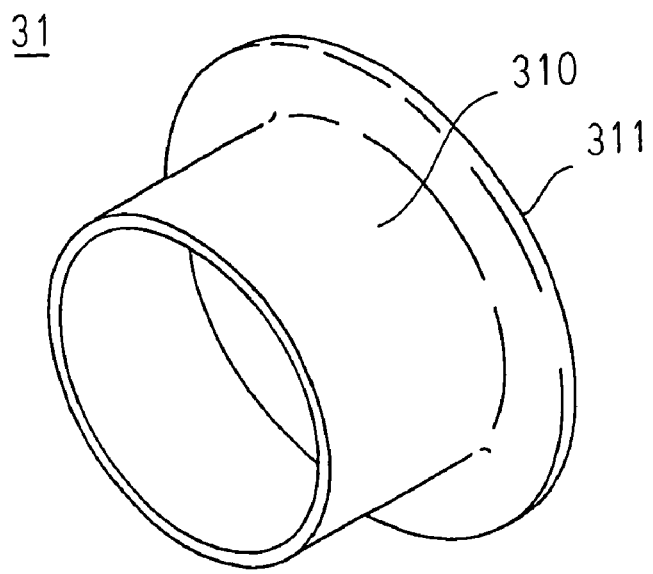
FIG. 3 is a perspective showing a plate used in the bobbin apparatus of the field coil in the brushless alternator according to Embodiment 1 of the present invention.

FIG. 1 is a longitudinal section showing a brushless alternator according to Embodiment 1 of the present invention, FIG. 2 is a partial enlarged cross section showing a vicinity of a bobbin apparatus of a field coil in the brushless alternator shown in FIG. 1, and FIG. 3 is a perspective showing a plate used in the bobbin apparatus of the field coil in the brushless alternator according to Embodiment 1 of the present invention.

In FIG. 1, a brushless alternator 1 is constituted by: a magnetic pole core 3 of a rotor 2 functioning as a field; a field coil 13 secured in a position surrounded by magnetic poles of the magnetic pole core 3 and together with the magnetic pole core 3 constituting the rotor 2; a stator 14 functioning as an armature; first and second bearings 18 and 19 for rotatably supporting a shaft 17 constituting a rotating shaft of the rotor 2; first and second brackets 20 and 21; and a rectifier 22 electrically connected to the stator 14 for converting alternating-current power into a direct current, etc.

The magnetic pole core 3 is constituted by first and second magnetic pole cores 4 and 8.

The first magnetic pole core 4 has: a cylindrical first boss portion 5 having a shaft insertion aperture disposed through a central axial position; a thick ring-shaped first yoke portion 6 disposed so as to extend radially outward from a first end of the first boss portion 5; and a first claw-shaped magnetic pole portion 7 disposed so as to extend toward a second axial end from an outer circumference of the first yoke portion 6. The first magnetic pole core 4 is mounted so as to be unable to rotate relative to the shaft 17 by press-fitting the shaft 17 into the shaft insertion aperture of the first boss portion 5.

Similarly, the second magnetic pole core 8 has: a cylindrical second boss portion 9 having a shaft insertion aperture disposed through a central axial position; a thick ring-shaped second yoke portion 10 disposed on an outer circumference of a second end of the second boss portion 9; and a second claw-shaped magnetic pole portion 11 disposed so as to extend toward a first end from an outer circumference of the second yoke portion 10. The second boss portion 9 is mounted so as to be unable to rotate relative to the shaft 17 by press-fitting the shaft 17 into the shaft insertion aperture thereof with a first end surface thereof abutted to a second end surface of the first boss portion 5. The second claw-shaped magnetic pole portion 11 is disposed so as to intermesh with the first claw-shaped magnetic pole portion 7, and is integrated by welding, brazing, etc., a ring 12 made of a non-magnetic material which is disposed on an inner circumferential side of the first and second claw-shaped magnetic pole portions 7 and 11, and the first and second claw-shaped magnetic pole portions 7 and 11. In addition, the second yoke portion 10 is fixed to an inner wall surface of the second bracket 21, and is disposed so as to leave a minute clearance between the second yoke portion 10 and the second boss portion 9 and between the second yoke portion 10 and the second claw-shaped magnetic pole portion 11.

The stator 14 has a stator core 15 in which a stator winding 16 is installed, and is disposed so as to surround an outer circumference of the rotor 2.

The first bracket 20 and the second bracket 21 are fastened and integrated by a through bolt 23 on mutually opposite sides of shoulder portions at first and second axial ends of the stator core 15. The first bracket 20 rotatably supports sides of a first end of the shaft 17 by means of the first bearing 18, and the second bracket 21 rotatably supports sides of a second end of the shaft 17 by means of the second bearing 19. Thus, the rotor 2 is rotatably disposed inside the first and second brackets 20 and 21.

A pulley 24 is fixed to a first end portion of the shaft 17 projecting outside the first bracket 20 so as to be driven by an engine (not shown).

In the brushless alternator 1 constructed in this manner, an electric current is supplied to the field coil 13 from a battery (not shown), generating a magnetic flux. The first claw-shaped magnetic pole portion 7 is magnetized into North-seeking (N) poles by this magnetic flux, and the second claw-shaped magnetic pole portion 11 is magnetized into South-seeking (S) poles.

At the same time, the pulley 24 is driven by the engine, rotating the shaft 17. Thus, the rotor 2 is rotated, applying a rotating magnetic field to the stator core 15 and generating an electromotive force in the stator winding 16. This alternating-current electromotive force is converted into a direct current by the rectifier 22 to charge the battery.

Here, because the field coil 13 is mounted to the second yoke portion 10, which is fixed to the second bracket 21, the first magnetic pole core 4 in which the first boss portion 5, the first yoke portion 6, and the first claw-shaped magnetic pole portion 7 are formed integrally, and the second boss portion 9 and the second claw-shaped magnetic pole portion 11 of the second magnetic pole core 8 rotate. In other words, the field coil 13 does not rotate.

Here, a bobbin apparatus 30, as shown in FIG. 2, is constituted by: the second yoke portion 10 fixed to the second bracket 21, a plate 31 connected to the second yoke portion 10 by welding, and a bobbin 32 for housing the field coil 13 disposed inside a space formed by the second yoke portion 10 and the plate 31.

The second yoke portion 10 is formed into a ring shape having a rectangular cross section. A stepped portion 100 is formed into an annular shape by increasing a diameter of an inner circumferential surface of the second yoke portion 10 from a first end for an axial length p. In addition, a recess portion 101 for preventing swiveling is recessed into a first end surface of the second yoke portion 10.

The plate 31, as shown in FIG. 3, is prepared by press-forming a soft steel plate, and is provided with: a cylindrical portion 310 having a hollow cylindrical shape; and a disk-shaped flange portion 311 disposed so as to extend radially outward from a first end of the cylindrical portion 310.

The bobbin 32 is prepared into a general spool shape using a resin, and is provided with: a cylindrical portion 320 having a hollow cylindrical shape; and a pair of disk-shaped flange portions 321 and 322 disposed so as to extend radially outward from first and second ends of the cylindrical portion 320. A lug 323 for preventing swiveling is disposed so as to protrude from an outer circumferential surface of the flange portion 322 at the second end.

Next, dimensional relationships between each of the members of this bobbin apparatus 30 will be explained.

An outside diameter of the cylindrical portion 310 of the plate 31 is generally equivalent to an inside diameter of the stepped portion 100 of the second yoke portion 10, and an outside diameter of the flange portion 311 is generally equivalent to an outside diameter of the second yoke portion 10. The stepped portion 100 is formed so as to have a depth that is slightly larger than a thickness of the cylindrical portion 310 so that welding traces do not project radially inward beyond an inner circumference of the second yoke portion 10. An inside diameter of the cylindrical portion 320 of the bobbin 32 is generally equivalent to the outside diameter of the cylindrical portion 310 of the plate 31. An axial length of the bobbin 32 is generally equivalent to a length obtained by subtracting the axial length (p) of the stepped portion 100 from an axial length of the cylindrical portion 310 of the plate 31. In addition, a radial length of the flange portions 321 and 322 of the bobbin 32 is generally equivalent to a radial length of the flange portion 311 of the plate 31. Moreover, the lug 323 is disposed so as to protrude from the flange portion 322 in such a positional relationship as to engage with the recess portion 101 recessed in the second yoke portion 10.

Next, a procedure for assembling the bobbin apparatus 30 constructed in this manner will be explained.

First, the field coil 13 is wound onto the bobbin 32. Then, the plate 31 is inserted into the bobbin 32. Next, a second axial end portion of the cylindrical portion 310 of the plate 31 projecting out of the bobbin 32 is inserted into the stepped portion 100 of the second yoke portion 10 so as to be fitted inside. At this time, the plate 31 is positioned on the second yoke portion 10 relative to an axial direction by abutting an end surface of the cylindrical portion 310 to an end surface of the stepped portion 100. An outer circumferential surface of the second axial end portion of the cylindrical portion 310 is placed in close contact with an inner circumferential surface of the stepped portion 100. In addition, the bobbin 32 is positioned on the second yoke portion 10 relative to a circumferential direction by engaging the lug 323 formed on the flange portion 322 into the recess portion 101 recessed in the second yoke portion 10.

Thereafter, portions of the second yoke portion 10 and the cylindrical portion 310 of the plate 31 overlapping in a radial direction are spot-welded, for example, from an inner circumferential side at four positions at a uniform angular pitch in a circumferential direction, for example, completing assembly of the bobbin apparatus 30.

Thus, in this bobbin apparatus 30, an annular stepped portion 100 is formed at a first end of an inner circumferential surface of a thick ring-shaped second yoke portion 10, a second axial end portion of a cylindrical portion 310 of a plate 31 is fitted inside so as to overlap with the stepped portion 100 in a radial direction, and the cylindrical portion 310 of the plate 31 is integrated by welding to the second yoke portion 10 in the radially-overlapping region.

Now, this plate 31 is supported by the second yoke portion 10 in a cantilever construction, but because the second yoke portion 10 and the cylindrical portion 310 of the plate 31 are fixed in a state of surface contact in the region of the stepped portion 100 (a range of axial length p), supporting strength for the plate 31 is ensured, increasing the vibration resistance of the plate 31. In other words, the supporting strength for the plate 31 in the present construction is significantly larger than the supporting strength of a cantilevered supporting construction for a plate in which an end surface of a cylindrical portion of the plate is abutted to an end surface of a yoke portion and welded, enabling the supporting strength to approach that of a plate in a conventional bobbin apparatus in which a cylindrical portion of a plate is mounted so as to be fitted over a thin portion projecting out of a yoke portion and welded.

Because a thin side of the weld portion between the second yoke portion 10 and the plate 31 (the cylindrical portion 310 of the plate 31) is exposed radially inward axially outside the bobbin 32, the two can be welded without being influenced by the bobbin 32. Thus, workability is improved during welding. In addition, even if there are changes in position or increases in the number of welds accompanying changes in a welding specification, they can be dealt with without altering the shape of the bobbin 32, increasing the degree of design freedom and also enabling reductions in cost.

Because thin portions projecting out of the yoke portion such as those in conventional bobbin apparatuses are no longer necessary, the outside diameter of the cylindrical portion 320 of the bobbin 32 is reduced by an amount proportionate to the thickness of the thin portions. Thus, because the winding diameter of the field coil 13 is smaller, shortening the length of the conducting wire, reductions in cost can be achieved by saving material in the field coil 13.

Moreover, because the second yoke portion 10 can be prepared without using turning such as that used in conventional bobbin apparatuses, the disposal rate of material is reduced and manufacturing time is short, enabling reductions in cost.

Now, when output characteristics of alternators (output voltage: 24V; rated region actual output: 55A) mounted with the present bobbin apparatus 30 (axial dimension L of second yoke portion 10=22.5 mm; length of overlap p=6 mm) and with a conventional bobbin apparatus were measured, it was confirmed that improvements in output of electric power of approximately 1.5 percent (1.5%) to approximately 2.5 percent (2.5%) were obtained in a high-speed rotational frequency region (a vicinity of an alternator rotational frequency of 5,000 rpm, corresponding to the rated region), and declines in output arose in a low-speed rotational frequency region (a vicinity of an alternator rotational frequency of 1,500 rpm) in cases in which the present bobbin apparatus 30 was mounted compared to cases in which a conventional bobbin apparatus was mounted. The proportions of these declines in output are approximately 1.0 percent (1.0%) to approximately 1.5 percent (1.5%) of electric power, and when viewed as a whole, it can be said that the output characteristics of the alternator are improved by adopting the construction of the present bobbin apparatus 30.

Because the outside diameter of the bobbin 32 of the present bobbin apparatus 30 can be made smaller than the outside diameter of the bobbins of conventional bobbin apparatuses, winding space for the field coil 13 is increased. Thus, with the present bobbin apparatus 30, because the decline in output in the low-speed rotational frequency region can be compensated for by increasing the number of winds in the field coil 13, an alternator can be achieved enabling output in the high-speed rotational frequency region to be increased while maintaining output in the low-speed rotational frequency region.

Moreover, it can be inferred that the improvements in output in the high-speed rotational frequency region are the result of "the magnetomotive force per unit length, which is equal to the electric current in amperes times the number of winds in the coil divided by the length of the magnetic path," being increased due to the inner circumferential diameter of the field coil 13 being reduced. It can also be inferred that the decline in output in the low-speed rotational frequency region is the result of a gap crossing the magnetic path being enlarged due to the formation of the stepped portion 100.

Embodiment 2

Figure 4:
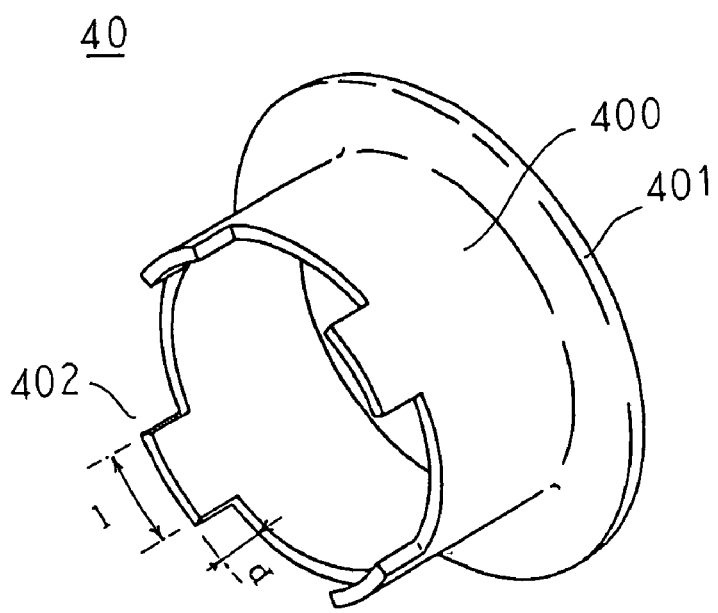
FIG. 4 is a perspective showing a plate used in a bobbin apparatus of a field coil in a brushless alternator according to Embodiment 2 of the present invention.

FIG. 4 is a perspective showing a plate used in a bobbin apparatus of a field coil in a brushless alternator according to Embodiment 2 of the present invention.

In FIG. 4, a plate 40 is prepared by press-forming a soft steel plate, and is provided with: a cylindrical portion 400 having a hollow cylindrical shape; a disk-shaped flange portion 401 disposed so as to extend radially outward from a first end of the cylindrical portion 400; and four tongue segments 402 disposed so as to extend axially outward from a second end of the cylindrical portion 400. The four tongue segments 402 are formed on the cylindrical portion 400 at a uniform angular pitch in a circumferential direction, each being formed to an axial length p and a circumferential width 1.

Furthermore, although not shown, four stepped portions having a circumferential width 1 and an axial length p are formed at a uniform angular pitch in a circumferential direction on an inner circumferential surface of a second yoke portion. Moreover, this second yoke portion is constructed in a similar manner to the second yoke portion 10 in Embodiment 1 above except for the fact that strip-shaped stepped portions are formed instead of an annular stepped portion 100.

Moreover, the rest of this embodiment is constructed in a similar manner to Embodiment 1 above.

Next, dimensional relationships between each of the members of this bobbin apparatus will be explained.

An outside diameter of the cylindrical portion 400 of the plate 40 and of the tongue segments 402 is generally equivalent to an inside diameter of the stepped portions of the second yoke portion, and an outside diameter of the flange portion 401 is generally equivalent to an outside diameter of the second yoke portion. The stepped portions are formed so as to have a radial depth that is slightly larger than a thickness of the cylindrical portion 400 and of the tongue segments 402 so that welding traces do not project radially inward beyond an inner circumference of the second yoke portion. In addition, the axial length l and the circumferential width p of the stepped portions are generally equivalent to the axial length and the circumferential width of the tongue segments 402. An inside diameter of the cylindrical portion 320 of the bobbin 32 is generally equivalent to the outside diameter of the cylindrical portion 400 of the plate 40. An axial length of the bobbin 32 is generally equivalent to the axial length of the cylindrical portion 400 of the plate 40. In addition, a radial length of the flange portions 321 and 322 of the bobbin 32 is generally equivalent to a radial length of the flange portion 401 of the plate 40.

To assemble the bobbin apparatus in Embodiment 2, first the field coil 13 is wound onto the bobbin 32. Then, the plate 40 is inserted into the bobbin 32. Next, the tongue segments 402 (a second axial end portion) of the plate 40 projecting out of the bobbin 32 are inserted into the stepped portions of the second yoke portion. At this time, the plate 40 is positioned on the second yoke portion relative to an axial direction by abutting an end surface of the cylindrical portion 400 to an end surface of the second yoke portion. An outer circumferential surface of each of the tongue segments 402 is placed in close contact with an inner circumferential surface of a stepped portion. Thereafter, the second yoke portion and the tongue segments 402 of the plate 40 are spot-welded, for example, from an inner circumferential side, completing assembly of the bobbin apparatus.

Thus, in this bobbin apparatus, stepped portions having a circumferential width l and an axial length p are recessed at a uniform angular pitch in a circumferential direction at a first end of an inner circumferential surface of a thick ring-shaped second yoke portion, tongue segments 402 projecting axially outward from a second end of a cylindrical portion 400 of a plate 40 are fitted inside so as to overlap with each of the stepped portions in a radial direction, and the tongue segments 402 of the plate 40 are integrated by welding to the second yoke portion from an inner circumferential side.

Thus, similar effects to those in Embodiment 1 above can also be achieved in Embodiment 2.

Furthermore, in Embodiment 2, because the inner circumferential surface of the second yoke portion is present between the stepped portions, the gap crossing the magnetic path is reduced compared to Embodiment 1 above in which an annular stepped portion 100 is formed. As a result, declines in output in the low-speed rotational frequency region resulting from the formation of a stepped portion are suppressed.

Moreover, in Embodiment 2 above, four tongue segments 402 are formed at a uniform angular pitch in a circumferential direction, but the number of the tongue segments 402 is not limited to four, provided that a predetermined supporting strength is achieved.

What is claimed is:

1. A brushless alternator field coil bobbin apparatus comprising:
  a thick ring-shaped yoke portion;
  a plate comprising:
  a cylindrical portion; and
  a disk-shaped flange portion disposed so as to extend radially outward from a first end of said cylindrical portion; and
  a bobbin onto which a field coil is wound,
  wherein a stepped portion is recessed into an inner circumferential surface of said yoke portion so as to extend axially for a predetermined length from a first end of said yoke portion,
  a second axial end portion of said cylindrical portion of said plate is fitted into said stepped portion so as to be placed in close contact with an inner circumferential surface thereof and is welded to said yoke portion, and
  said bobbin is mounted into a space formed by said yoke portion and said plate; and
  wherein said second axial end portion of said cylindrical portion of said plate is formed into a tongue segment having a predetermined circumferential width and projecting axially outward, and said stepped portion is formed to a circumferential width and an axial length that fit together with said tongue segment.

2. A brushless alternator field coil bobbin apparatus comprising:
  a thick ring-shaped yoke portion;
  a plate comprising:
  a cylindrical portion; and
  a disk-shaped flange portion disposed so as to extend radially outward from a first end of said cylindrical portion; and
  a bobbin onto which a field coil is wound,
  wherein a stepped portion is recessed into an inner circumferential surface of said yoke portion so as to extend axially for a predetermined length from a first end of said yoke portion,
  a second axial end portion of said cylindrical portion of said plate is fitted into said stepped portion so as to be placed in close contact with an inner circumferential surface thereof and is welded to said yoke portion, and
  said bobbin is mounted into a space formed by said yoke portion and said plate; and
  wherein said second axial end portion of said cylindrical portion of said plate is welded to said yoke portion from an inner circumferential side.

3. The brushless alternator field coil bobbin apparatus according to claim 2, wherein said second axial end portion of said cylindrical portion of said plate is formed into a tongue segment having a predetermined circumferential width and projecting axially outward, and
  said stepped portion is formed to a circumferential width and an axial length that fit together with said tongue segment.

* * * * *